United States Patent
Dandoko et al.

(10) Patent No.: US 9,924,057 B2
(45) Date of Patent: Mar. 20, 2018

(54) IMAGE FORMING DEVICE THAT CAN BE OPERATED FROM A TERMINAL DEVICE

(71) Applicant: KYOCERA Document Solutions Inc., Osaka (JP)

(72) Inventors: Takushi Dandoko, Osaka (JP); Keiko Morita, Osaka (JP); Michiko Tashiro, Osaka (JP); Kenta Toyamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/125,160

(22) PCT Filed: Mar. 6, 2015

(86) PCT No.: PCT/JP2015/056585
§ 371 (c)(1),
(2) Date: Sep. 10, 2016

(87) PCT Pub. No.: WO2015/137240
PCT Pub. Date: Sep. 17, 2015

(65) Prior Publication Data
US 2017/0019549 A1     Jan. 19, 2017

(30) Foreign Application Priority Data

Mar. 10, 2014 (JP) .................................. 2014-045916

(51) Int. Cl.
*H04N 1/00* (2006.01)

(52) U.S. Cl.
CPC ....... *H04N 1/00891* (2013.01); *H04N 1/0001* (2013.01); *H04N 1/00307* (2013.01);
(Continued)

(58) Field of Classification Search
CPC ........ H04N 1/00891; H04N 2201/0075; H04L 41/22; G06F 3/1454
(Continued)

(56) References Cited

U.S. PATENT DOCUMENTS

| 2003/0025735 A1* | 2/2003 | Polgar ................. G06F 3/04886 715/771 |
| 2006/0067654 A1* | 3/2006 | Herberger ............. G06F 3/0481 386/231 |

(Continued)

FOREIGN PATENT DOCUMENTS

| JP | H07-084736 A | 3/1995 |
| JP | 2006-059083 A | 3/2006 |

(Continued)

*Primary Examiner* — Jamares Q Washington
(74) *Attorney, Agent, or Firm* — Hawaii Patent Services; Nathaniel K. Fedde; Kenton N. Fedde (57) ABSTRACT

In order to promote the use of a display panel as an operation panel part, if a communicable terminal device (9) is detected (S1), a CPU (10) requests the terminal device (9) to transmit panel information (S2), and determines, on the basis of the panel information, whether or not the operability of the terminal device (9) is higher than that of an operation panel part (6) (S3). If the operability of the terminal device (9) is higher than that of the operation panel part (6), the CPU (10) displays a terminal device utilization screen on a display panel (61) (S4). If an operation of an image forming device (1) by the terminal device (9) is selected by a user, the CPU (10) generates data for displaying an image of an operation screen based on the display on the display panel (61) and a setting value set by the operation of the operation panel part (6), and transmits the data to the terminal device (9) (S6).

6 Claims, 11 Drawing Sheets

(52) U.S. Cl.
CPC ............... *H04N 2201/0075* (2013.01); *H04N 2201/0094* (2013.01)

(58) Field of Classification Search
USPC ............... 358/1.13, 1.15; 345/173, 1.2, 2.1; 715/733, 740
See application file for complete search history.

(56) References Cited

U.S. PATENT DOCUMENTS

| | | | | |
|---|---|---|---|---|
| 2008/0291283 | A1* | 11/2008 | Achiwa | H04N 1/00204 348/207.2 |
| 2011/0007351 | A1* | 1/2011 | Kurumasa | H04N 1/00204 358/1.15 |
| 2011/0119606 | A1* | 5/2011 | Abe | G06F 9/4448 715/763 |
| 2012/0069371 | A1* | 3/2012 | Fujii | G06F 3/1208 358/1.13 |
| 2013/0194628 | A1 | 8/2013 | Kamimoto | |
| 2013/0328878 | A1* | 12/2013 | Stahl | G06F 3/1431 345/428 |
| 2014/0082347 | A1* | 3/2014 | Fujii | G06F 8/70 713/100 |

FOREIGN PATENT DOCUMENTS

| | | |
|---|---|---|
| JP | 2007-049750 A | 2/2007 |
| JP | 2009-284203 A | 12/2009 |
| JP | 2011-019090 A | 1/2011 |
| JP | 2013-030965 A | 2/2013 |
| JP | 2013-157860 A | 8/2013 |
| JP | 2014-022960 A | 2/2014 |

\* cited by examiner

IMAGE FORMING DEVICE THAT CAN BE OPERATED FROM A TERMINAL DEVICE

FIELD OF THE INVENTION

The present invention relates to an image forming device communicable with a terminal device.

BACKGROUND

In the following Patent Literature 1, it has been disclosed a technology that when portable telephones are connected to each other, the portable telephones divide image data for one screen into two screens. One portable telephone displays an image of the divided one screen, and the other portable telephone displays an image of the divided other screen. Further, in the Patent literature 2, it has been disclosed a technology that an external utilization screen is created based on all the option functions implementable in an image forming device connected to a server device via a network, and any image forming device is able to be operated using the external utilization screen.

PRIOR ART DOCUMENT

Patent Literature

Patent Literature 1: JP 2009-284203 A
Patent Literature 1: JP 2011-019090 A

SUMMARY OF THE INVENTION

Problem to be Solved by the Invention

Although in the above Patent Literature 1, however, a screen area can be extended using an external panel, it could not compare visibility of the screen unless the portable telephones are connected to each other. In the above Patent Literature 2, although the image forming device could be made easy-to-use by standardizing screen composition, only the display panel installed in the image forming device was able to be used.

The present invention is made in view of such a problem, and an object thereof is to provide an image forming device able to successfully solve the above problem.

Means for Solving the Problem

To achieve such a problem, the image forming device according to the present invention includes a terminal device detecting part that detects a communicable terminal device; a panel information requesting part that requests the terminal device detected by the terminal device detecting part to transmit panel information; a panel information receiving part that receives the panel information transmitted from the terminal device in response to a request from the panel information requesting part; an operability determining part that determines whether or not operability of the terminal device detected by the terminal device detecting part is higher than that of a display panel based on the panel information received by the panel information receiving part; a terminal device operation utilization part that prompts a user to operate the terminal device if the operability determining part determines that the terminal device has higher operability than that of the display panel; an operation request receiving part that receives a request for operation of the terminal device by a user; and a display data transmitting part that transmits data for displaying a screen to the terminal device if the operation request receiving part receives the request for operation of the terminal device.

Effects of the Invention

According to the present invention, since the terminal device carried by a user is automatically detected, and the user is prompted to take the terminal device as an operation panel part if the terminal device has high operability, the invention allows the user promote the use of a display panel of the terminal device as the operation panel part.

Further, even with an image forming device which is not normally used can know whether or not the terminal device carried by a user has high operability.

MODES FOR CARRYING OUT THE INVENTION

Embodiment

Figure 1:
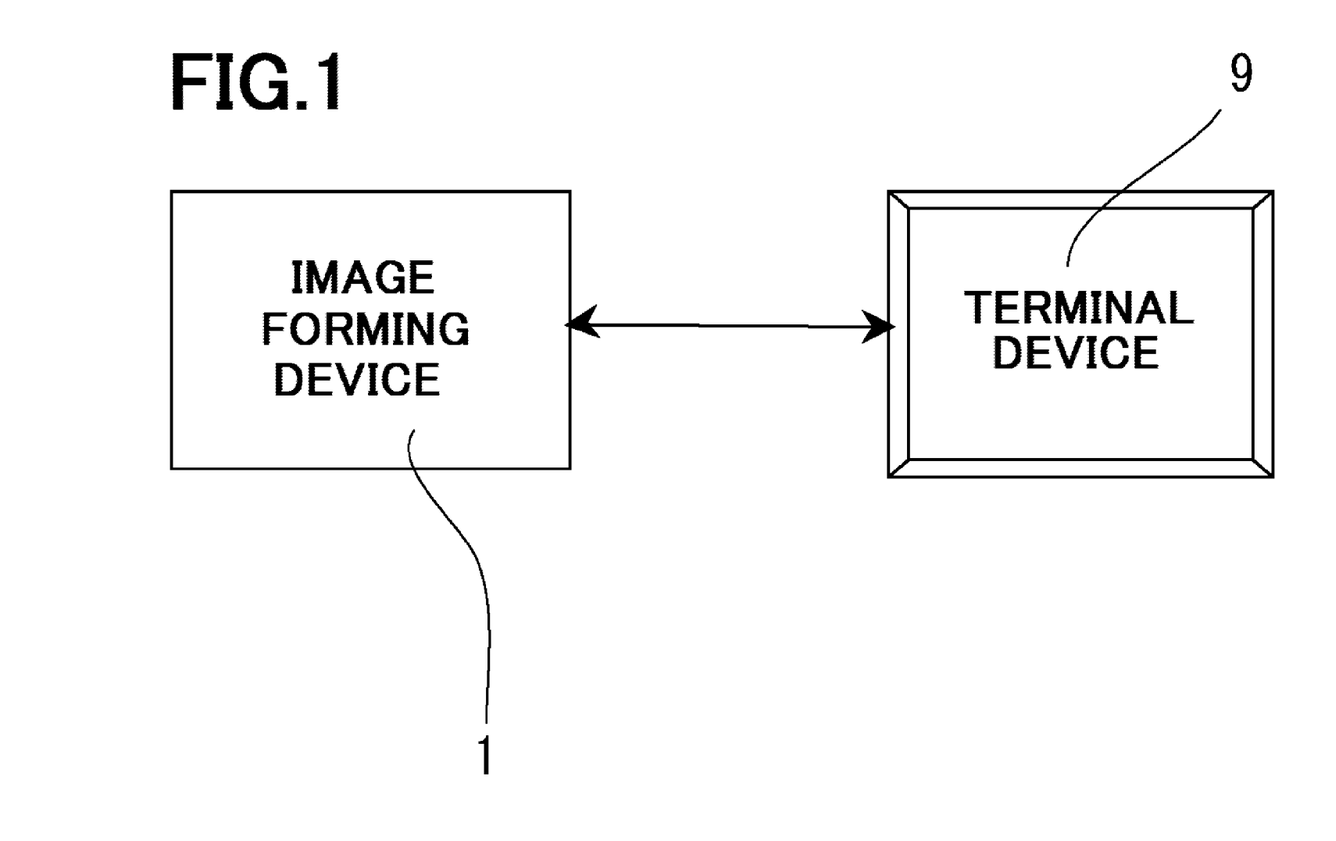
FIG. 1 is a schematic drawing showing an image forming system of one embodiment according to the present invention.

First of all, a description will be given to a configuration of a printing system according to one embodiment of the present invention with reference to FIG. 1. FIG. 1 is a block diagram of the printing system.

The printing system includes an image forming device 1, and a terminal device 9 communicable with the image forming device 1. The terminal device 9 includes, for example, a device such as a portable notebook computer, in addition to a portable terminal device such as a smartphone and a portable telephone.

The terminal device 9 stores an operation app to operate the image forming device 1 via communication. The operation app includes user information to specify a user, and panel information to specify a panel size of a display panel 95 (see FIG. 6) provided on the terminal device 9. Further, the operation app transmits the user information and the panel information to the image forming device 1 in response to a request from the image forming device 1. Moreover, the operation app displays image data transmitted from the image forming device 1 on the display panel 95, and at the same time receives an operation of the image forming device 1 by a user, and transmits the result to the image forming device 1.

[Configuration of Image Forming Device 1]

Next, a detailed description will be given to a configuration of the image forming device 1 according to one embodiment of the present invention with reference to FIG. 2.

Figure 2:
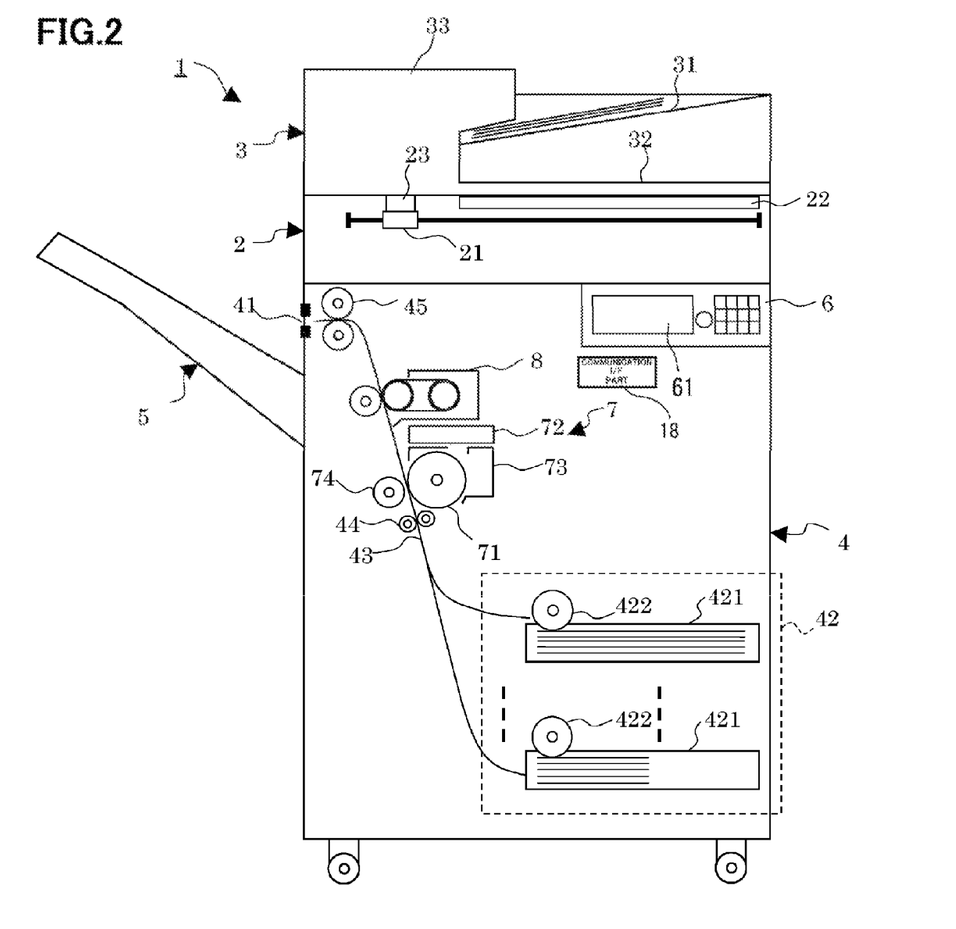
FIG. 2 is a schematic drawing showing a configuration of the image forming device shown in FIG. 1

Referring to FIG. 2, the image forming device 1 of the present embodiment includes a document reading part 2, a document feeding part 3, a main body part 4, a stack tray 5, an operation panel part 6 (input part), and a communication I/F part 18. The communication I/F part 18 is arranged around the operation panel part 6.

The document reading part 2 is arranged on an upper part of the main body part 4, and the document feeding part 3 is arranged on an upper part of the document reading part 2. The stack tray 5 is arranged at a discharging port 41 side of a recording paper provided in the main body part 4. Further, the operation panel part 6 is arranged at a front side of the main body part 4.

The document reading part 2 includes a scanner 21, a platen glass 22, and a document reading slit 23. The scanner 21 is composed of an exposure lamp, a CCD (Charge Coupled Device), a CMOS (Complementary Metal Oxide Semiconductor), and an imaging sensor, or the like, and is configured to be able to move in a conveying direction of a document by the document feeding part 3. The platen glass 22 is a document stand made of a transparent member such as a glass, or the like. The document reading slit 23 has a slit formed in an orthogonal direction with the conveying direction of a document by the document feeding part 3.

If a document mounted on the platen glass 22 is read, the scanner 21 is moved to a position opposed to the platen glass 22, captures image data by reading a document while scanning the document placed on the platen glass 22, and outputs the captured image data to the image forming device 17 (FIG. 3) provided in a control circuit of the main body part 4.

Further, if a document conveyed by the document feeding part 3 is read, the scanner 21 is moved to a position opposed to the document reading slit 23, captures image data by reading the document through the document reading slit 23 in synchronization with a conveying operation of the document by the document feeding part 3, and outputs the captured image data to an image forming part 13 (FIG. 3) provided in the control circuit of the main body part 4.

The document feeding part 3 includes a document mounting part 31, a document discharging part 32, and a document conveying mechanism 33. A document mounted on the document mounting part 31 is conveyed in an order one by one by the document conveying part 33 to a position opposed to the document reading slit 23. After that, the document is discharged into the document discharging part 32. In this connection, the document feeding part 3 is configured to be foldable, and an upper surface of the platen glass 22 can be opened by lifting upwardly the document feeding part 3.

The main body part 4 includes an image forming part 7 and at the same time includes a paper feeding part 42, a paper conveying path 43, a conveying roller pair 44, and a discharging roller pair 45. The paper feeding part 42 includes a plurality of paper feeding cassettes 421 in which recording papers having a different size and an orientation are stored, and a paper feeding roller 422 that delivers a recording part one by one from the paper feeding cassette 421.

The paper feeding roller 422, the conveying roller pair 44, and the discharging roller pair 45 function as a conveying part. A recording paper is conveyed by the conveying part. The recording paper delivered through the paper feeding roller 422 to the paper conveying path 43 is conveyed to the image forming device 7 through the conveying roller pair 44.

Then, the recording paper on which a recording is applied by the image forming part 7 is discharged into the stack tray 5 through the discharging roller pair 45.

The operation panel part 6 has an input part including a display panel 61 such as a LCD, a start key, a ten key, a toggle button of an operation mode such as copying/FAX transmission/scanner, or the like, and a button and a touch panel to give an instruction about printing, transmission, reception, saving, and recording. That is, the operation panel part 6 receives an instruction input by a user for these various jobs of the image forming device 1.

Further, the operation panel part 6 receives an authentication input such as a password by a user.

The Image forming part 7 includes a photosensitive drum 71, a charging part (not shown), an exposure part 72, a developing part 73, transferring part 74, and a fixing part 8. The charging part charges a surface of the photosensitive drum 71. The exposure part 72 is an optical unit with a laser device, a mirror, and a lens, or the like, and emits light based on image data, exposes the photosensitive dram 71, and forms a latent image on a surface of the photosensitive drum 71. The developing part 73 is a developing unit that develops the latent image formed on the photosensitive drum 71 using a toner, and forms a toner image on the photosensitive drum 71 based on the latent image.

The transferring part 74 transfers the toner image formed on the photosensitive drum 71 by the developing part 73. The fixing part 8 fixes the toner image on a recording paper by heating the recording paper on which the toner image is transferred by the transferring part 74.

Figure 3:
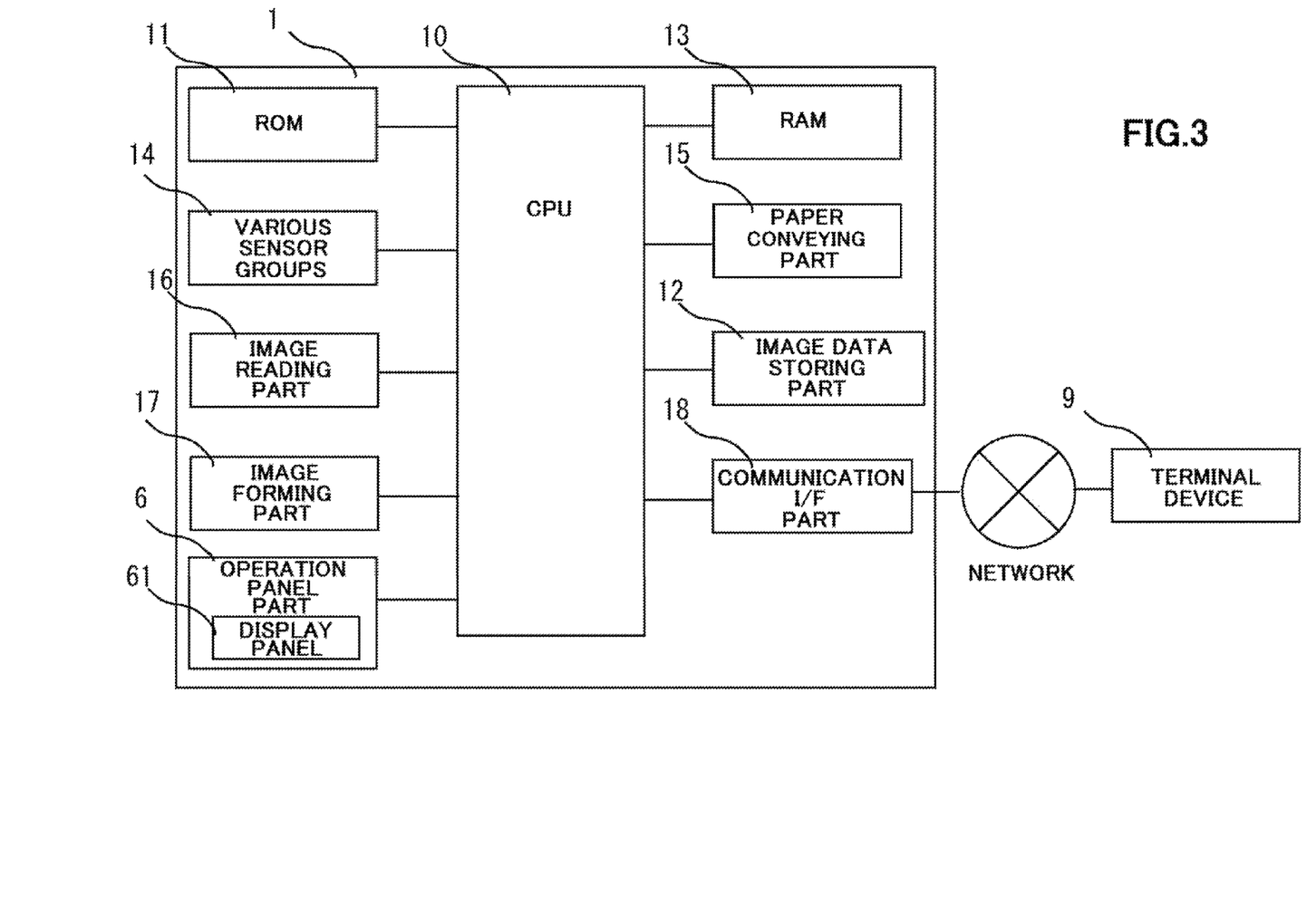
FIG. 3 is a schematic drawing showing a circuit configuration of the image forming device shown in FIG. 1.

A description will then be given to a circuit configuration of the image forming device 1.

FIG. 3 is a schematic drawing showing a circuit configuration of the image forming device 1.

The image forming device 1 includes a CPU 10 that acts as a control part to control an operation of the image forming device 1, a ROM 11 that stores a program and data to be used for processing of the CPU 10, an image data storing part 12 that stores image data for image formation, a RAM 13 that stores the other data used for processing of the CPU, various types of sensor groups 14, a paper conveying part 15, an image reading part 16, an image forming part 17, a communication I/F part 18, and the above operation panel part 6.

The paper conveying part 15 activates the document discharging part 32 of the document feeding part 3, the document conveying part 33, and a conveying part of the main body part 4. The various types of sensor groups 14 contain an imaging sensor provided in the scanner 21 of the document reading part 2 and an input part of the operation panel part 6. The document reading part 16 activates the scanner 21 of the document reading part 2. The image forming part 17 activates the image forming part 7 and the transferring part 74. The communication I/F part 18 is communicable with the terminal device 9 arranged around (e.g., within 1 m) the image forming device 1.

The CPU 10 controls an operation of the image forming device 1 in accordance with operation information input via the communication I/F part 18 from the terminal device 9, and at the same time transmits data necessary for display of a terminal device utilization screen to be described later in response to an operation state of the image forming device 1 to the terminal device 9 via the communication I/F part 18.

Further, the CPU 10 determines whether or not the terminal device 9 is in the vicinity communicable via the communication I/F part 18 based on whether or not the CPU 10 is communicable with the terminal device 9 via the communication I/F part 18, or on whether or not a radio field intensity of a radio wave transmitted from the terminal device 9 is more than a predetermined intensity (an example of a terminal device detecting part).

Moreover, the CPU 10 performs processing of displaying on the display panel 61 a terminal device utilization screen to prompt a user to operate the image forming device 1 by the terminal device 9.

Further, the CPU 10 executes terminal device utilization processing to be described later, prompts a user to operate the terminal device 9 having higher operability than that of the display panel 61, and transmits data to perform a screen display by the terminal device 9 (an example of an operability determining part, a terminal device operation utilization part, and a display data transmitting part).

Figure 4:
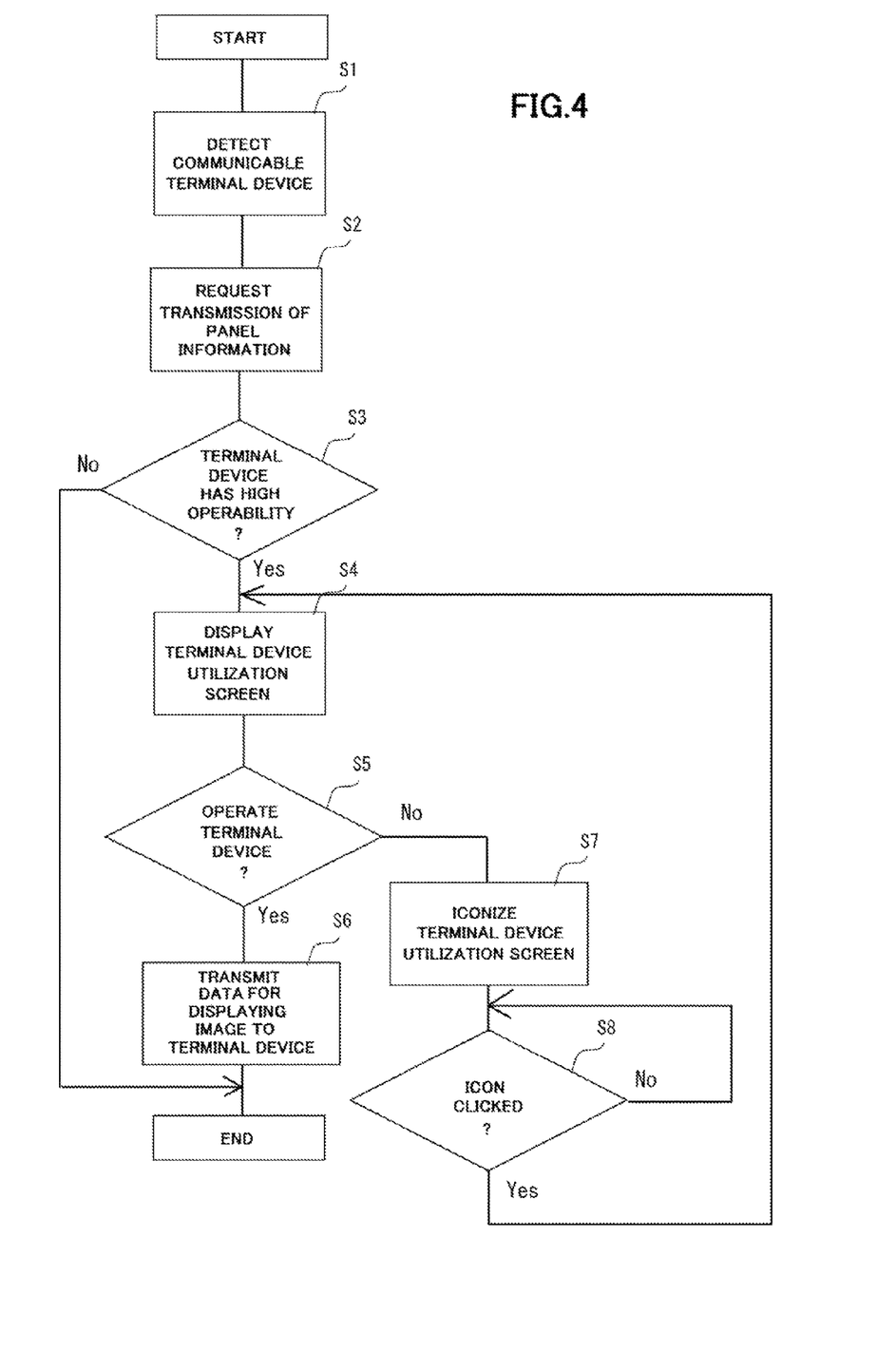
FIG. 4 is a flowchart showing terminal device utilization processing by the image forming device.

Hereinbelow, a description will be given to the terminal device utilization processing by the CPU 10. FIG. 4 is a flowchart showing an outline of the terminal device utilization processing.

If the CPU 10 detects the terminal device 9 communicable around the image forming device 1 (S1), the CPU 10 requests a transmission of panel information to the terminal device 9 (S2). The terminal device 9 which received the request transmits the panel information to the image forming device 1. If the panel information is transmitted from the terminal device 9, the CPU 10 determines whether or not operability of the terminal device 9 is higher than that of the operation panel part 6 based on the panel information (S3).

If the CPU 10 determines that the operability of the terminal device 9 is higher than that of the operation panel part 6, the CPU 10 displays on the display panel 61 a terminal device utilization screen to prompt a user to operate the image forming device 1 by the terminal device 9 (S4).

Figure 5A:
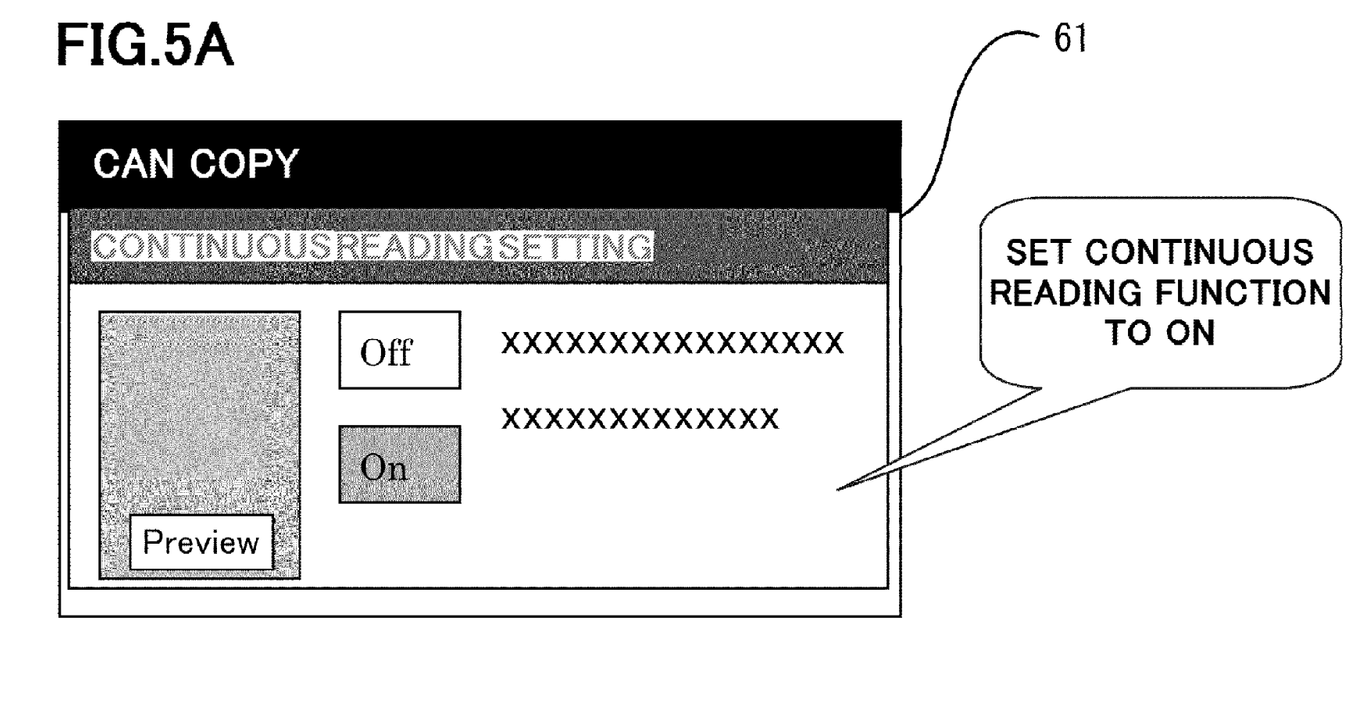
FIG. 5A is a first view showing a display image on a display panel shown in FIG. 2.
Figure 5B:
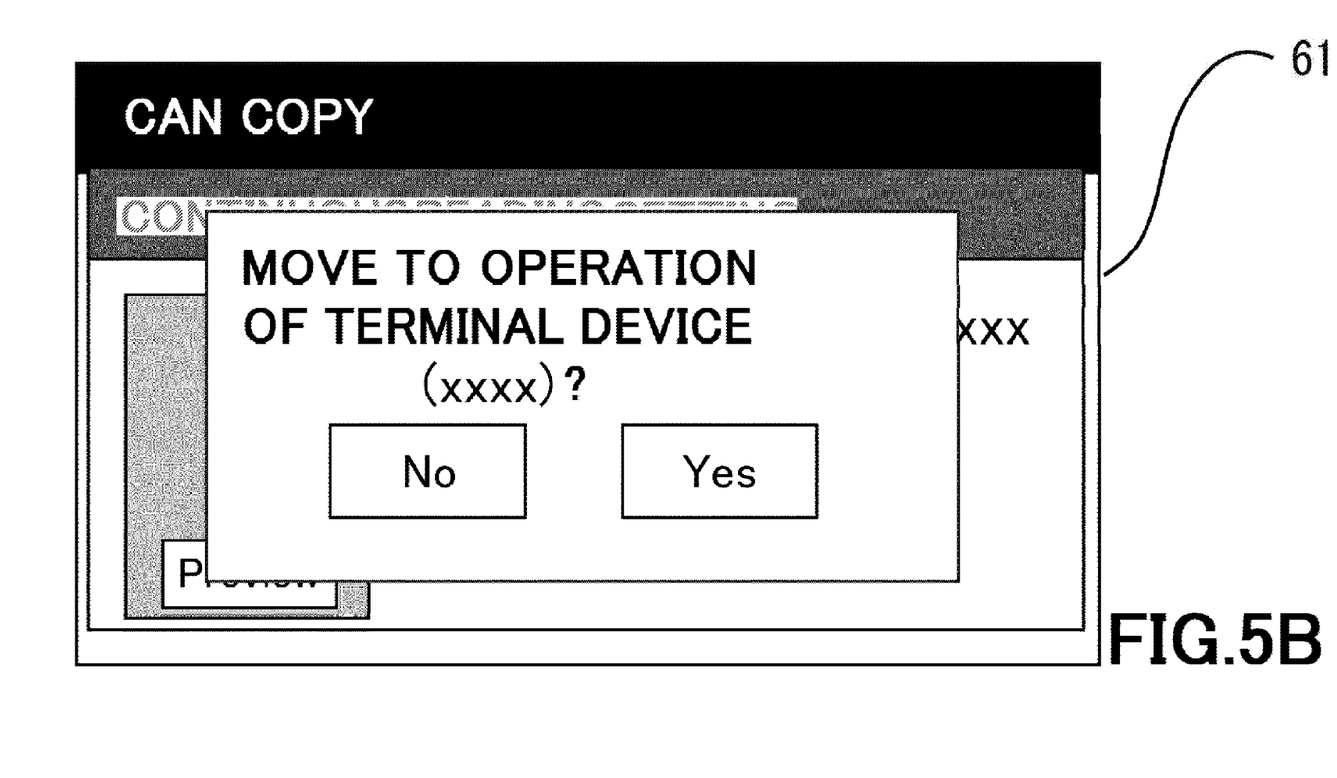
FIG. 5B is a first view showing a display image on the display panel shown in FIG. 2.

For example, as shown in FIG. 5A, the processing in S3 is executed in a state where a user sets continuous reading, a setting screen for the continuous reading is displayed on the display panel 61, and an operation is performed to turn on the settings of a continuous reading function by the display panel 61. If it is determined that operability of the terminal device 9 is higher than that of the operation panel part 6, a terminal device utilization screen as shown in FIG. 5B is displayed on the display panel 61. On the terminal device utilization screen, a message "moving to operation of terminal device (x x x x)?", a description of prompting a user to use the terminal device, and images "NO" and "YES" to input an answer to the message are displayed.

A user who is operating the display panel 61 can select an operation of the terminal device 9 or an operation of the operation panel part 6 by performing an operation of selecting either of "NO" or "YES" in response to an inquiry on the terminal device utilization screen. The CPU 10 determines whether or not an operation is performed by the terminal device 9, that is, whether or not an operation to the inquiry on the terminal device utilization screen is "YES" (S5).

In the terminal device utilization screen shown in FIG. 5B, if a user who confirmed the terminal device utilization screen displayed in S4 selects "YES" with the intention of operating the image forming device 1 by the terminal device 1, the determination in S5 becomes YES. Therefore, the CPU transmits data for displaying an image on the display panel 95 of the terminal device 9 based on a display on the display panel 61 and a setting value set by an operation of the operation panel part 6 (S6). The data to be transmitted by the CPU 10 in this processing is generated based on the display on the display panel 61 and the setting value set by the operation on the display panel 61.

Figure 6:
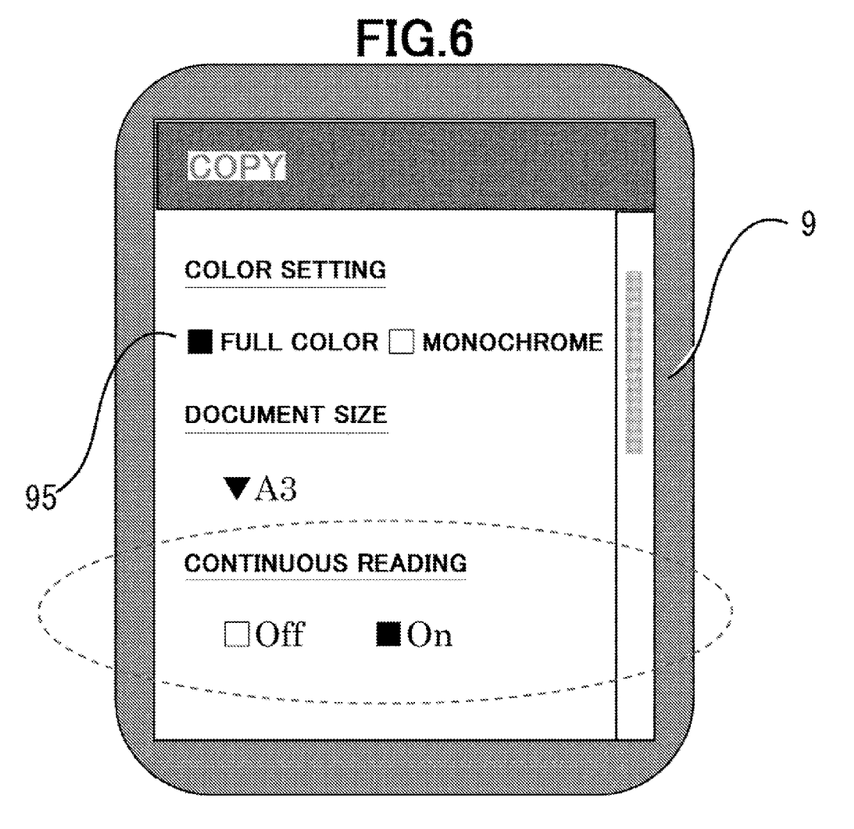
FIG. 6 is a first view showing a display image on the display panel of the terminal device.

The terminal device 9 displays an operation screen of the image forming device 1 on the display panel 95 based on the image data transmitted from the image forming device 1.

The display panel 95 of the terminal device 9 displays, as shown in FIG. 6, a setting screen of the image forming device 1. As shown in FIG. 6, the setting screen displayed on the display panel 95 is generated based on the display on the display panel 61 and the setting value set by the operation of the display panel 61. Specifically, in the setting screen shown in FIG. 6, a color setting is set to "full color", a document size is set to "A3", and continuous reading is set to "ON", but these settings are ones taken over from the settings determined by an operation of the display panel 61.

After that, the terminal device 9 transmits information in accordance with an operation by a user to the image forming device 1, and the CPU 10 which received the information performs a setting in accordance with the operation by the user on the terminal device 9.

Otherwise, if a user who firmed a terminal device utilization screen displayed in S4 selects "NO" with the intention of operating the display panel 6, the determination in S5 becomes No. Therefore, the CPU 10 saves the terminal device utilization screen by iconizing it (S7), and makes the terminal device utilization screen ready for redisplaying on the display panel 61 by selecting the icon (an example of an iconization part).

Figure 7A:
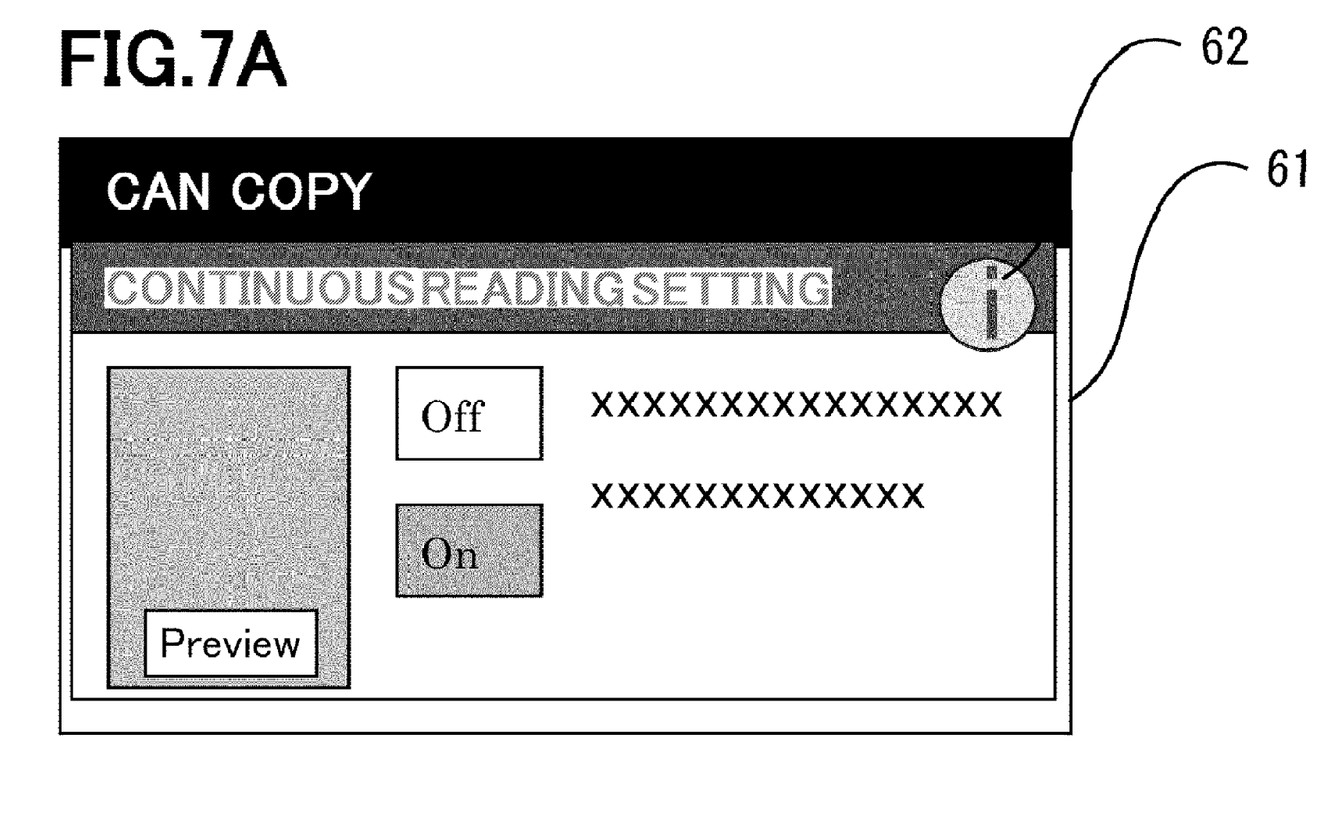
FIG. 7A is a second view showing a display image on the display panel shown in FIG. 2.

In this processing, for example, as shown in FIG. 7A, the terminal device utilization screen is previously iconized and displayed as an icon 62 at an upper right of a setting screen of the continuous reading of the display panel 61.

Figure 7B:
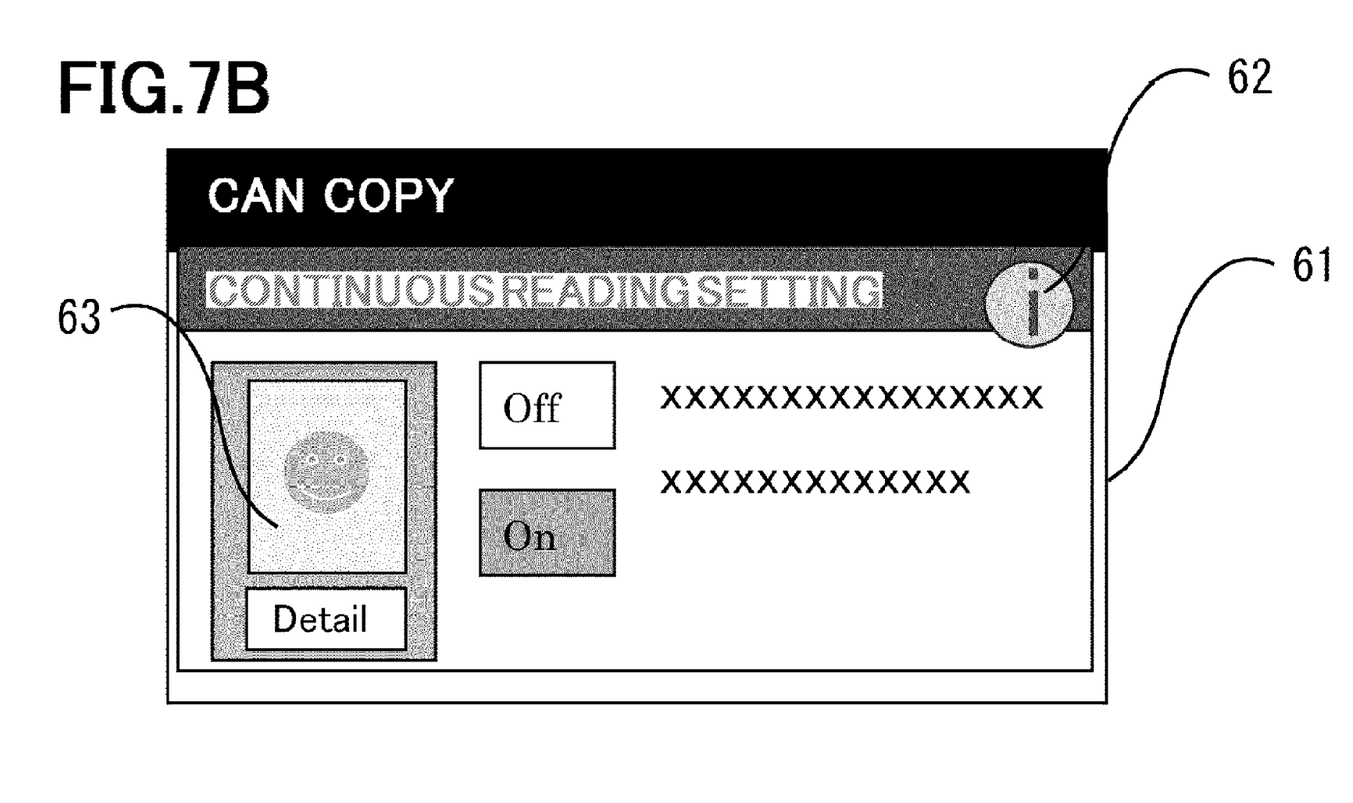
FIG. 7B is a second view showing a display image on the display panel shown in FIG. 2.

Subsequently, the CPU 10 determines whether or not a click is made on the iconized terminal device utilization screen in the processing in S7 (S8). For example, as shown in FIG. 7B, when a user feels that operability of the operation panel part 6 is bad, and a preview image 63 is hard to understand due to this at a point in time when a preview display is executed and an image of a document is confirmed, if the user performs an operation of selecting (clicking) the icon 62, the determination in S8 becomes Yes. Therefore, the CPU 10 executes the processing in S4. As a result, as shown in FIG. 7C, the terminal device utilization screen saved in S7 is redisplayed on the display panel 61.

This enables a user to select an operation of the terminal device 9 by selecting the icon 62 on the operation panel part 62 at a time when the user wishes to redisplay, even if once the user selects an operation on the operation panel part 6.

Figure 7C:
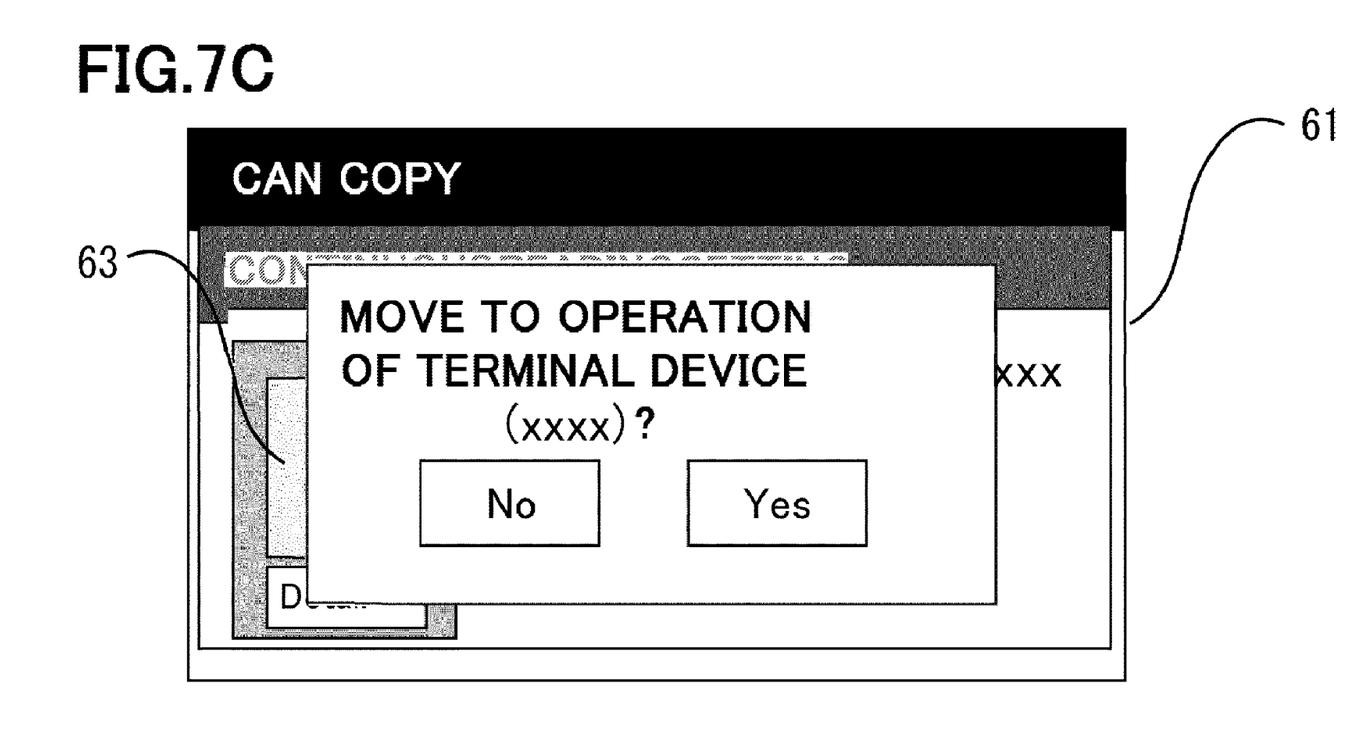
FIG. 7C is a second view showing a display image on the display panel shown in FIG. 2.
Figure 8:
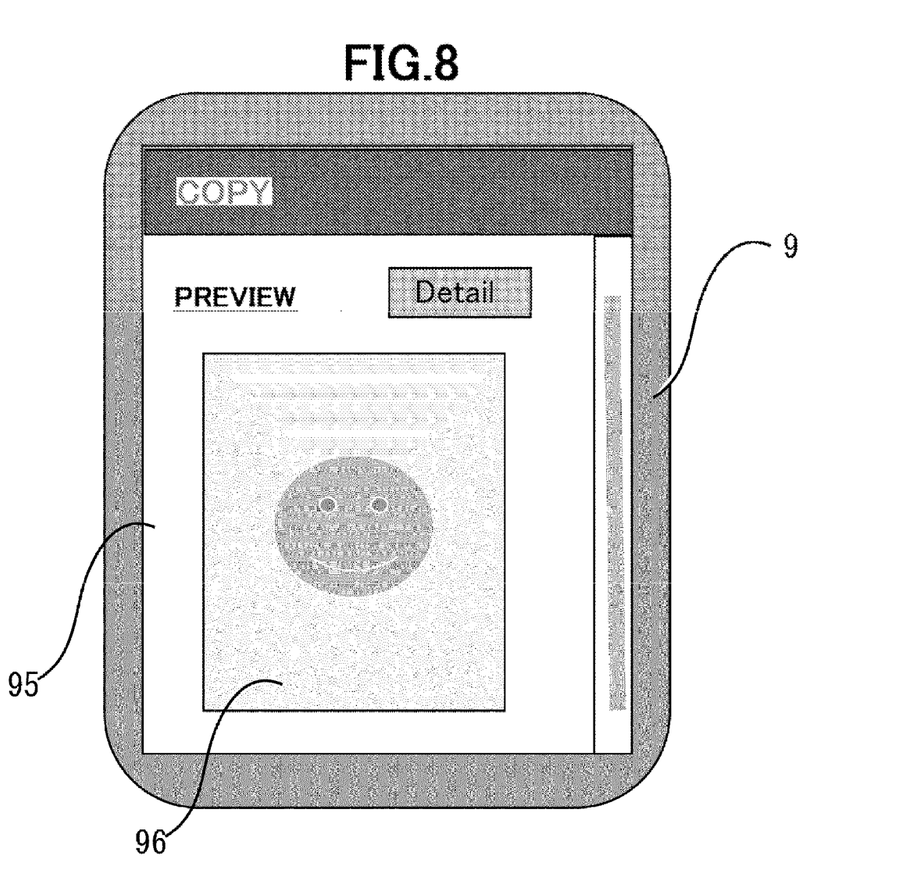
FIG. 8 is a second view showing a display image on the display panel of the terminal device.

Then, if a user selects "YES" on the terminal device utilization screen shown in FIG. 7C, the determination in S5 becomes YES, and the CPU 10 transmits data for displaying an image on the display panel 95 of the terminal device 9 to the terminal device 9 based on a setting value set by an operation of the operation panel part 6 (S6). The data to be transmitted by the CPU 10 in this processing is generated based on a display on the display panel 61 and a setting value set by an operation of the display panel 61. Then, in the display panel 95 of the terminal device 9 which received the data, as shown in FIG. 8, a preview display is performed on the display panel 61. This enables a user to confirm the preview image 96 on the display panel 95 of the terminal device 9 having high operability.

Configuring as above can achieve effects as follows.

According to the present embodiment, since the terminal device 1 carried by a user is automatically detected and the user is prompted to operate the image forming device 1 via the terminal device 9 if the terminal device 9 has higher operability than that of the operation panel part 6, the embodiment allows the user to promote the use of the terminal device 9 as an operation part.

Further, according to the present embodiment, the embodiment enables a user to know whether or not the terminal device 9 carried by the user has higher operability than that of the operation panel part 6, even with the use of the image forming device 1 which is not normally used.

While in the above embodiment, a description is given to a case where the display panel 95 of the terminal device 9 with a larger panel size has high operability, not necessarily limited thereto, it may be configured that the display panel 95 with high resolution has high operability. Alternatively, it may be configured that a color panel has higher operability than that of a monochrome panel. Still alternatively, it may be configured that the terminal device 9 is determined to have high operability if a display language at the display panel 71 side is different from that at the terminal device 9 side.

Yet alternatively, it may be configured that the image forming device 1 includes an energy saving state transition part that causes the operation panel part 6 to transit to an energy saving state when the image forming device 1 receives a request for operation of the terminal device 9 from a user. When the image forming device 1 comes to a state where the image forming device 1 is made ready for receiving an operation of the terminal device 9 on receiving the request for operation of the terminal device 1 from the user, the energy saving state transition part resets a setting value on the operation panel part 6 and transits to an energy saving state.

Besides, it is not saying that the configuration and operation set forth in the above embodiment are mere exemplary illustrations, and thus may be executed by appropriately modifying those within a range not departing from the sprit of the present invention.

The invention claimed is:

1. An image forming device comprising:
   an operation panel part that includes a display panel and a touch panel, and that receives an instruction input for jobs;
   a terminal device detecting part that detects a communicable terminal device;
   a panel information requesting part that requests the terminal device detected by the terminal device detecting part to transmit panel information;
   a panel information receiving part that receives the panel information transmitted from the terminal device in response to a request from the panel information requesting part;
   an operability determining part that determines whether or not operability of the terminal device detected by the terminal device detecting part is higher than that of the display panel based on the panel information received by the panel information receiving part;
   a terminal device operation utilization part that displays, on a setting screen of the display panel of the image forming device on which a setting for jobs is performed by a user using the operation panel part, a pop-up screen prompting the user to change operation for performing the setting for jobs from using the operation panel part to using the terminal device if the operability determining part determines that the terminal device has higher operability than that of the display panel, wherein the pop-up screen is not displayed if the operability determining part determines that the terminal device does not have higher operability than that of the display panel;
   an operation request receiving part that receives a request for changing operation for performing the setting for jobs from using the operation panel part to using the terminal device;
   a display data transmitting part that transmits, if the operation request receiving part receives the request for changing operation to using the terminal device, data for displaying a screen to the terminal device that is generated based on a display on the display panel and a setting value set by an operation using the operation panel part; and
   an energy saving state transition part that causes the operation panel part to transit to an energy saving state when the operation request receiving part receives a request for changing operation to using the terminal device.

2. The image forming device according to claim 1, wherein the operability determining part determines that the display panel with a large panel size has high operability.

3. The image forming device according to claim 1, wherein the operability determining part determines that the display panel with high resolution has high operability.

4. The image forming device according to claim 1, wherein the operability determining part determines that a color panel has higher operability than that of a monochrome panel.

5. The image forming device according to claim 1, wherein the operability determining part determines that the terminal device has high operability if a display language at a display panel side is different from that at a terminal device side.

6. The image forming device according to claim 1, further comprising an iconization part that saves a terminal device utilization screen as an icon that can redisplay the terminal device utilization screen by selecting the terminal device utilization screen to be displayed by the terminal device operation utilization part for prompting the user to operate the terminal device if the operation request receiving part does not receive the request for operation of the terminal device.

* * * * *